United States Patent [19]

Thomas

[11] Patent Number: 5,285,670
[45] Date of Patent: Feb. 15, 1994

[54] PINCH ROLL AND SHEAR COMBINATION

[75] Inventor: John E. Thomas, Pittsburgh, Pa.
[73] Assignee: Tippins Incorporated, Pittsburgh, Pa.
[21] Appl. No.: 961,512
[22] Filed: Oct. 15, 1992
[51] Int. Cl.⁵ .................. B21B 39/16; B21C 47/02
[52] U.S. Cl. .................................. 72/146; 72/203; 226/181; 242/78.1
[58] Field of Search ............... 72/129, 130, 146, 148, 72/203, 204, 229; 83/156, 697; 226/181, 190; 242/78.1, 78.6

[56] References Cited

U.S. PATENT DOCUMENTS

| | | | |
|---|---|---|---|
| 1,918,968 | 7/1933 | Keeney et al. | 72/148 |
| 3,197,992 | 8/1965 | Taniguchi | 72/251 |
| 3,587,274 | 6/1971 | Rotter | 72/148 |
| 3,613,426 | 10/1971 | Adair et al. | 72/202 |
| 3,911,771 | 10/1975 | Schleifenbaum | 83/156 |
| 4,043,494 | 8/1977 | Bickford et al. | 226/181 |
| 4,096,724 | 6/1978 | Eshelman et al. | 72/146 |
| 4,430,874 | 2/1984 | Tippins et al. | 72/202 |
| 4,494,395 | 1/1985 | Brettbacher et al. | 72/203 |
| 4,497,191 | 2/1985 | Langer et al. | 72/202 |
| 4,522,050 | 6/1985 | Thomas | 72/229 |
| 4,524,659 | 6/1985 | Yunoki | 83/156 |
| 4,675,974 | 6/1987 | Connolly | 29/527.7 |
| 4,698,897 | 10/1987 | Frommann et al. | 29/527.7 |
| 4,793,169 | 12/1988 | Ginzburg | 72/240 |
| 4,958,677 | 9/1990 | Kimura | 164/452 |
| 4,976,024 | 12/1990 | Kimura | 29/527.6 |
| 5,079,941 | 1/1992 | De Blok et al. | 72/203 |
| 5,086,634 | 2/1992 | Richards | 72/161 |
| 5,094,094 | 3/1992 | Muramatsu et al. | 72/200 |

FOREIGN PATENT DOCUMENTS

| | | | |
|---|---|---|---|
| 0077006 | 6/1981 | Japan | 72/14 |

Primary Examiner—Lowell A. Larson
Assistant Examiner—Thomas C. Schoeffler
Attorney, Agent, or Firm—Webb, Burden, Ziesenheim & Webb

[57] ABSTRACT

A pinch roll and shear combination for use in a mill, such as a reversing hot strip mill. The pinch roll and shear combination includes a stationary frame provided with a rotatably mounted lower roll and stationary lower blade adjacent the lower roll. A rectilinearly movable carriage is mounted on the frame with a piston for moving the carriage. An upper roll is rotatably mounted on the carriage and cooperates with the lower roll to form a pinch roll. An upper blade assembly is mounted on the carriage and cooperates with the lower blade to form a shear.

17 Claims, 2 Drawing Sheets

PINCH ROLL AND SHEAR COMBINATION

BACKGROUND OF THE INVENTION

This invention relates to a pinch roll and shear combination for use in rolling mills, specifically for use with coilers on hot strip reversing mills.

In conventional continuous hot mills, a shear is located between the roughing stand or stands and the finishing train. When a hot reversing mill is employed in lieu of the continuous mill or the finishing train, a shear is likewise positioned well upstream of the hot reversing mill. With the advent of the use of coiler furnaces in conjunction with hot reversing mills, the location of the upstream shear has remained constant, with the upstream coiler furnace being downstream of the shear.

However, various advantages have been found for providing shears between a coiler and a roll stand, for example, the strip can be additionally trimmed at its leading and trailing ends after the finishing passes by the roll stand. The shear unit has been positioned on the pass line adjacent a pinch roll unit which precedes a coiler, as set forth in U.S. Pat. Nos. 4,497,191 and 4,494,395.

Pinch rolls are used in a number of ways on steel processing lines to control speed of travel or tension of steel strip. One such use is in conjunction with coilers. Examples of such pinch rollers are shown in U.S. Pat. Nos. 4,497,191; 3,613,426; 4,430,874 and 4,522,050.

These prior art devices provide bulky, cumbersome machines for pinch rolling and shearing of material being worked upon. The object of the present invention is to provide a compact, economical and efficient pinch roll and shear combination.

SUMMARY OF THE INVENTION

The present invention provides a pinch roll and shear combination for use in a strip mill, such as in conjunction with a coiler, which forms part of a reversing hot strip mill unit. The pinch roll and shear combination of the present invention includes a frame with a lower roll rotatably mounted on the frame, and a stationary lower blade mounted on the frame adjacent the lower roll. A movable carriage is mounted on the frame for rectilinear motion. A hydraulic cylinder is attached to the frame for moving the carriage. An upper roll is rotatably mounted on the carriage and cooperates with the lower roll on the frame to form a pinch roll. An upper blade assembly is mounted on the carriage, with the upper blade assembly adapted for reciprocating an upper blade relative to the carriage. An upper blade carried on the upper blade assembly cooperates with the lower blade to form a shear.

BRIEF DESCRIPTION OF THE DRAWINGS

Other objects and advantages of the present invention will become apparent in the description of the preferred embodiment in connection with the attached figures, of which.

DESCRIPTION OF THE PREFERRED EMBODIMENT

Figure 1:
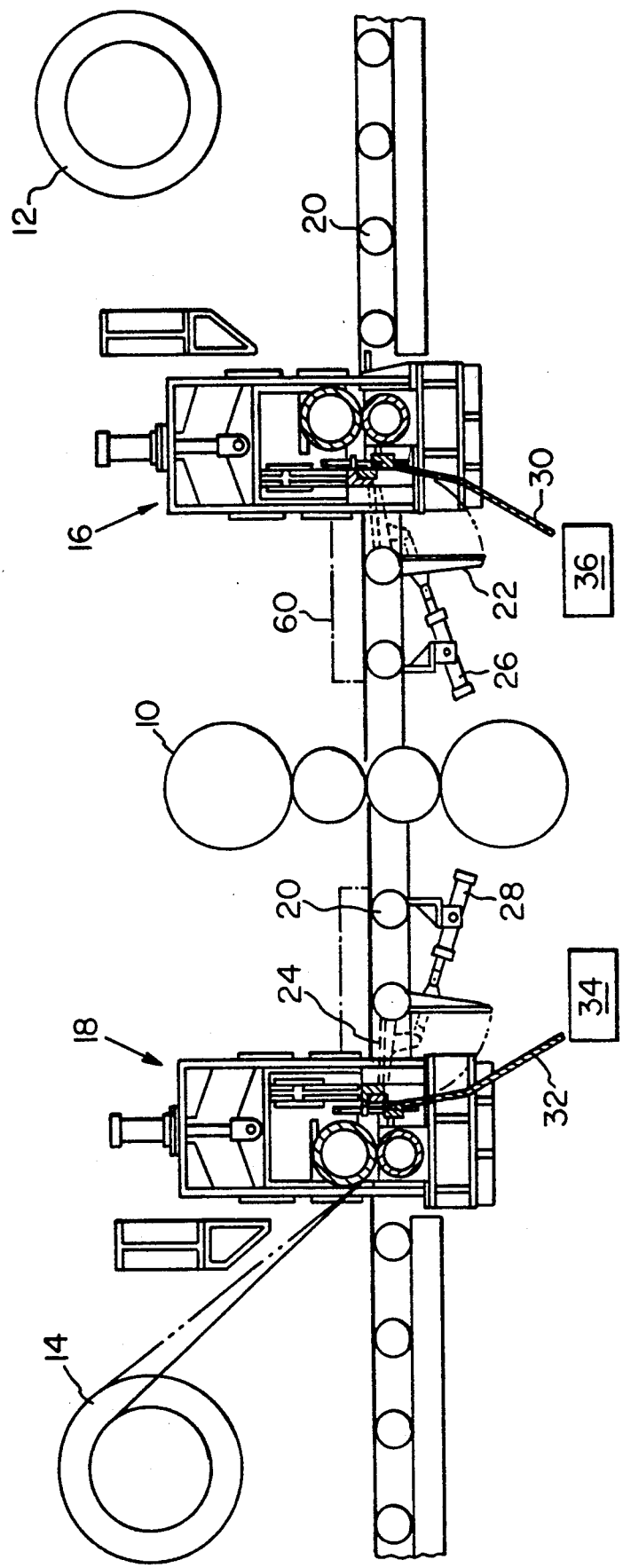
FIG. 1 is schematic of a reversing hot strip mill which includes the pinch roll and shear combination of the present invention.

FIG. 1 illustrates a hot strip mill which includes a rolling mill 10, shown as a four-high rolling mill, for reducing a slab of material to be worked on. A pair of coiler furnaces 12 and 14 are provided on opposite sides of the rolling mill 10 with each coiler furnace adapted to coil the material to be worked on after passing through the rolling mill 10. A pair of pinch roll and shear combinations 16 and 18 are provided on opposite sides of the rolling mill 10 adjacent the openings of the coiler furnaces 12 and 14.

Within a roller table 20, on either side of the rolling mill 10, a pair of crop removal deflectors 22 and 24 are pivotally coupled to the roller table 20. The crop removal deflectors 22 and 24 are positioned immediately adjacent the pinch roll and shear combinations 16 and 18, respectively. Pistons 26 and 28 are mounted to the roller table 20 and operate to pivot the crop removal deflectors 22 and 24, respectively. Guide plates 30 and 32 extend between a pinch roll and shear combination 16 or 18, and a crop removal bin 34 or 36, respectively, positioned below the respective pinch roll and shear combination.

Figure 2:
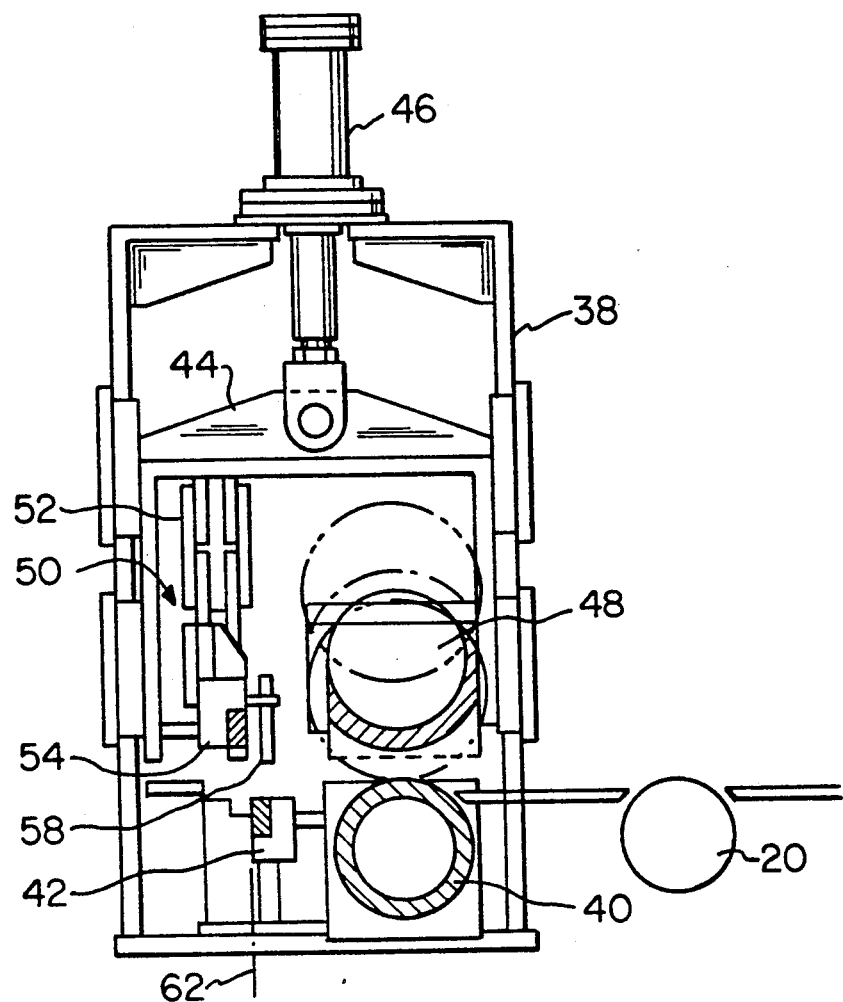
FIG. 2 is an enlarged view of the pinch roll and shear combination shown in FIG. 1.

The pinch roll and shear combination is best illustrated in FIG. 2. The pinch roll and shear combination 16 includes a frame 38 upon which a lower roll 40 is rotatably mounted. A stationary lower blade 42 is mounted on the frame 38 adjacent the rotatable lower roll 40. A rectilinearly movable carriage 44 is mounted within the frame 38. A hydraulic cylinder 46 is attached to the frame 38 and coupled to the carriage 44. The hydraulic cylinder 46 is adapted to move the carriage 44 in a rectilinear manner. An upper roll 48 is rotatably mounted on the carriage 44 and is aligned with the lower roll 40 such as to form a pinch roll.

Figure 3:
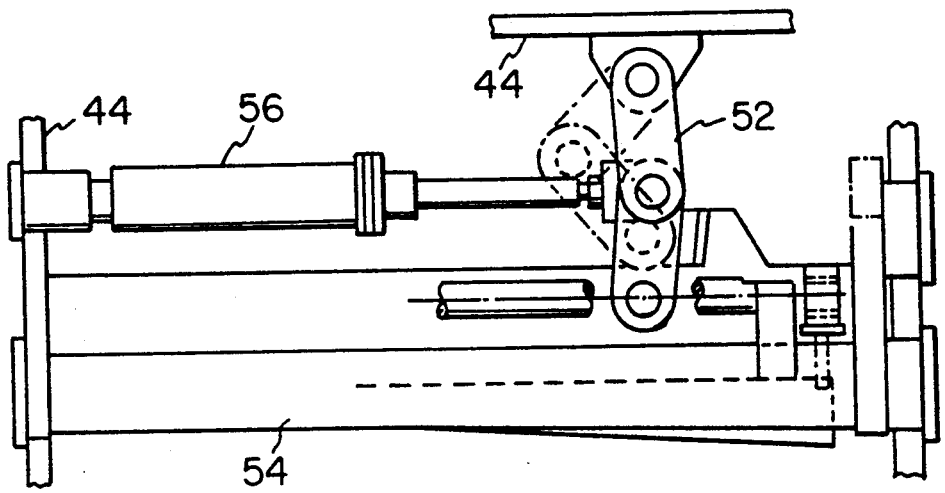
FIG. 3 is a side view of the upper blade assembly of the pinch roll and shear combination shown in FIG. 2.

An upper blade assembly 50 is mounted on the carriage 44 and is aligned with the lower blade 42 to form a shear. As shown in FIG. 3, the upper blade assembly 50 includes a pivotable linkage assembly 52 which attaches an upper blade 54 to the carriage 44. A hydraulic cylinder 56 is mounted to the carriage 44 and coupled to the linkage assembly 52. The cylinder 56 operates to pivot the linkage assembly 52 which in turn rectilinearly moves the upper blade 54 relative to the carriage 44. As shown in FIG. 2, the upper blade 54 includes a hold-down bar 58 which is positioned vertically above the lower blade 42 and adjacent the upper blade 54.

The pinch roll and shear combination 16 and 18 of the present invention provide a compact, economical and efficient pinch roll and shear device for use in rolling mills. In operation, a slab of material to be worked upon, such as the steel slab 60 shown in FIG. 1, is passed back and forth on the roller table 20 through the rolling mill 10. Each pass of the slab 60 through the rolling mill 10 reduces the thickness of the slab 60. The slab is reduced to a point until it can be coiled, at which time it will be coiled in one of the two coiler furnaces 12 and 14. The coiled material will be passed from one coiler furnace to the other through the rolling mill 10 until the desired, finished product is obtained. During such operation, the pinch rolls of the pinch roll and shear combination will be utilized in the conventional fashion to move the material in and out of the coilers and through the rolling mill. The shears of the pinch roll and shear combination can be utilized on the workpiece at any time throughout the process. For example, the shears may be utilized to crop the leading and trailing ends of the material being worked upon after the final pass through the rolling mill 10. Additionally, the shears may also be utilized to provide a clean leading edge in the middle of the rolling process.

The pinch roll of the present invention has been found to work effectively when utilizing an upper roll 48 which has a diameter larger than the diameter of the lower roll 40. For example, a 24" diameter upper roll has been utilized with an 18" diameter lower roll 40. Additionally, the carriage 44 is provided with a sufficient range of motion to allow the upper roll 48 to be moved completely out of the way (e.g. a "high pass"). A 14" stroke for the hydraulic cylinder 46 provides sufficient range of motion for the carriage 44.

The present invention may also provide an improved shearing action for cropping the workpiece. The compact arrangement of the present invention allows the lower blade 42 to be positioned closely adjacent the lower roll 40. For example, when an 18" diameter lower roll 40 is utilized, the cutting line 62 formed by the shear is about 20" from the center line of the lower roll 40. This close proximity may improve the quality of the cut being performed. While a material is being sheared between cooperating blades 42 and 54, it is being held between the pinch rolls 40 and 48 immediately adjacent the cutting line 62. This action will further assist the operation of the hold-down bar 58 in obtaining a smooth shear of the workpiece.

The present arrangement minimizes the space required for including a shear and pinch roll, as well as minimizing the structural components of these individualized units.

It will become apparent to those of ordinary skill in the art that various modifications may be made to this invention without departing from the spirit and scope thereof. Consequently, the scope of the present invention is intended to be limited only by the attached claims.

I claim:

1. A pinch roll and shear combination comprising:
a frame;
a lower roll rotatably mounted on said frame;
a lower blade mounted on said frame adjacent said lower roll;
a movable carriage mounted on said frame;
a means for moving said carriage;
an upper roll rotatably mounted on said carriage and cooperating with said lower roll to form a pinch roll; and
an upper blade assembly mounted on said carriage, wherein said upper blade assembly cooperates with said lower blade for form a shear and wherein said upper blade assembly is mounted for movement relative to said carriage.

2. The combination of claim 1 wherein said carriage moving means is a hydraulic cylinder mounted on said frame.

3. The combination of claim 1 wherein said upper blade assembly includes a pivotable linkage assembly coupling said upper blade assembly to said carriage, a hydraulic cylinder is mounted to said carriage and is coupled to said linkage assembly wherein said hydraulic cylinder operates to pivot said linkage assembly which rectilinearly moves said upper blade assembly relative to said carriage.

4. The combination of claim 1 wherein said upper blade assembly includes a hold-down bar positioned vertically above said lower blade, and an upper blade adjacent said hold-down bar.

5. The combination of claim 1 wherein said carriage is mounted for rectilinear motion.

6. The combination of claim 1 wherein said upper roll has a diameter which is larger than said lower roll.

7. A hot strip mill comprising:
a rolling mill for reducing a slab of material to be worked on;
at least one coiler furnace, with each said coiler furnace adapted to coil the material to be worked on from said rolling mill; and
at least one pinch roll and shear combination, with each pinch roll and shear combination being provided adjacent one of said at least one coiler furnace, said pinch roll and shear combination including a frame, a lower roll rotatably mounted on said frame, a lower blade mounted on said frame adjacent said lower roll, a movable carriage mounted on said frame, a means for moving said carriage, an upper roll rotatably mounted on said carriage and cooperating with said lower roll to form a pinch roll, an upper blade assembly mounted on said carriage, wherein said upper blade assembly cooperates with said lower blade to form a shear and wherein said upper blade assembly is mounted for movement relative to said carriage.

8. The hot strip mill of claim 7 wherein a pair of coiler furnaces are provided with said coiler furnaces positioned on opposite sides of said rolling mill; and
a pair of pinch roll and shear combinations provided on opposite sides of said rolling mill.

9. The hot strip mill of claim 7 further comprising a pivotable crop removal deflector being positioned adjacent said shear and cooperating with a crop removal bin positioned below said shear and adapted to receive material removed by said shear.

10. The hot strip mill of claim 9 further comprising guide plates extending between said crop removal bin and said lower blade to guide the material removed by said shear to said crop removal bin.

11. The hot strip mill of claim 7 wherein said carriage moving means is a hydraulic cylinder mounted on said frame.

12. The hot strip mill of claim 7 wherein said upper blade assembly includes a pivotable linkage assembly coupling said upper blade assembly to said carriage, a hydraulic cylinder mounted to said carriage and coupled to said linkage assembly wherein said hydraulic cylinder operates to pivot said linkage assembly which rectilinearly moves said upper blade assembly relative to said carriage.

13. The hot strip mill of claim 7 wherein said upper blade assembly includes a hold-down bar positioned vertically above said lower blade, and an upper blade adjacent said hold-down bar.

14. The hot strip mill of claim 7 wherein said carriage is mounted for rectilinear motion.

15. The hot strip mill of claim 7 wherein said upper roll has a diameter larger than the diameter of said lower roll.

16. A pinch roll and shear combination comprising:
a frame;
a lower roll rotatably mounted on said frame;
a lower blade mounted on said frame adjacent said lower roll;
a movable carriage mounted on said frame;
a means for moving said carriage;

an upper roll rotatably mounted on said carriage and cooperating with said lower roll to form a pinch roll;

an upper blade assembly mounted on said carriage, with said upper blade assembly cooperates with said lower blade for form a shear and said upper blade assembly mounted for movement relative to said carriage; and means to move said upper blade assembly relative to said carriage, said upper blade assembly moving means including a pivotable linkage assembly coupling said upper blade assembly to said carriage.

17. A hot strip mill comprising:

a rolling mill for reducing a slab of material to be worked on;

at least one roller table for conveying material to said rolling mill;

at least one coiler furnace, with each said coiler furnace adapted to coil the material to be worked on from said rolling mill; and at least one pinch roll and shear combination, with each pinch roll and shear combination being provided adjacent one of said at least one coiler furnace, said pinch roll and shear combination including a frame, a lower roll rotatably mounted on said frame below said roller table, a lower blade mounted on said frame adjacent said lower roll below said roller table, a movable carriage mounted on said frame above said roller table, a means for moving said carriage, an upper roll rotatably mounted on said carriage above said roller table and cooperating with said lower roll to form a pinch roll, an upper blade assembly mounted on said carriage, wherein said upper blade assembly cooperates with said lower blade to form a shear and wherein said upper blade assembly is mounted for movement relative to said carriage.

* * * * *

UNITED STATES PATENT AND TRADEMARK OFFICE
CERTIFICATE OF CORRECTION

PATENT NO. : 5,285,670
DATED : February 15, 1994
INVENTOR(S) : John E. Thomas

It is certified that error appears in the above-indentified patent and that said Letters Patent is hereby corrected as shown below:

Claim 1 Line 53 Column 3 "for form" should read --to form--.

Claim 16 Line 6 Column 5 "cooperates" should read --cooperating--.

Claim 16 Line 7 Column 5 "for form" should read --to form--.

Signed and Sealed this

Fourteenth Day of June, 1994

Attest:

BRUCE LEHMAN

*Attesting Officer*                *Commissioner of Patents and Trademarks*